US005865504A

United States Patent [19]

Warhaftig

[11] Patent Number: 5,865,504

[45] Date of Patent: Feb. 2, 1999

[54] RECLINING BACKREST SYSTEM FOR A PERSON IN A WHEELCHAIR

[75] Inventor: Stephen Warhaftig, Scarsdale, N.Y.

[73] Assignee: Skil-Care Corp., Yonkers, N.Y.

[21] Appl. No.: 246,167

[22] Filed: May 19, 1994

[51] Int. Cl.[6] .......... B60M 2/02

[52] U.S. Cl. .......... 297/354.12; 297/380; 297/DIG. 4

[58] Field of Search .......... 297/354.12, 380, 297/381, 223, 297, 299, 284.3, DIG. 4, 230.12, 354.1

[56] References Cited

U.S. PATENT DOCUMENTS

| | | | |
|---|---|---|---|
| 597,337 | 3/1898 | Boniface . | |
| 751,448 | 2/1904 | Barschow . | |
| 1,544,423 | 6/1925 | Behymer . | |
| 3,005,659 | 10/1961 | Sanders . | |
| 3,419,309 | 12/1968 | Smith . | |
| 3,746,392 | 7/1973 | German . | |
| 4,108,492 | 8/1978 | Kirby | 297/284.3 |
| 4,824,171 | 4/1989 | Hollingsworth | 297/380 X |
| 5,190,350 | 3/1993 | Hwang et al. | 297/380 |
| 5,407,248 | 4/1995 | Jay et al. | 297/284.3 X |
| 5,445,433 | 8/1995 | Avihod | 297/DIG. 4 X |

FOREIGN PATENT DOCUMENTS

| | | | |
|---|---|---|---|
| 138851 | 9/1950 | Australia | 297/380 |

*Primary Examiner*—Laurie K. Cranmer
*Attorney, Agent, or Firm*—Stephen A. Roen

[57] ABSTRACT

A reclining backrest system for a person in a wheelchair having a wheelchair frame which includes a pair of substantially vertical members, comprising a backrest, brace members and a cushion. The backrest is substantially rigid and has longitudinal and lateral edges. The lateral edges include a lower edge. The brace members have a certain amount of flexibility and are affixed to the lower edges of the backrest the to the pair of vertical frame members. The cushion is supported against the front portion of the backrest, and provides a substantially vertical, cushioned, backrest. The cushion comprises a plurality of longitudinally extending pockets, each pocket have at least one opening, disposed against the front portion of the backrest, and a plurality of removable pads adapted for insertion within the pockets, and for providing individual cushioned back surfaces.

24 Claims, 5 Drawing Sheets

FIG. 3
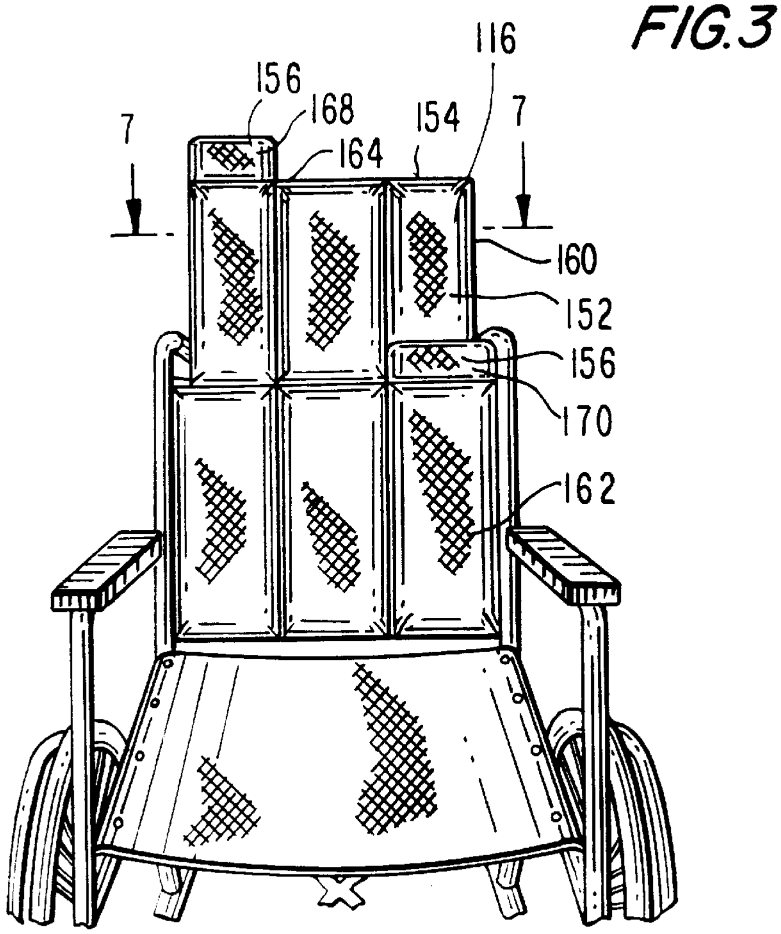
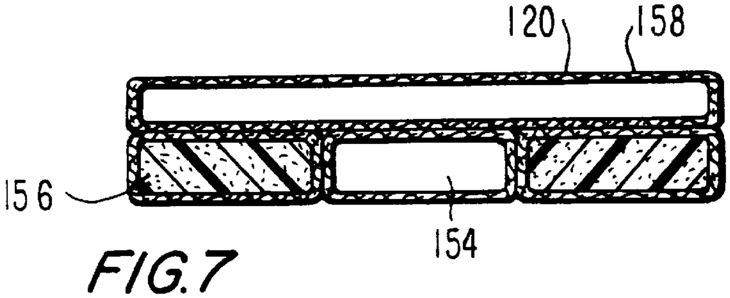
FIG. 7
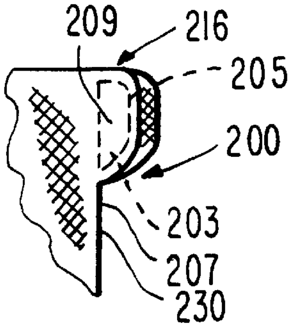
FIG. 9

RECLINING BACKREST SYSTEM FOR A PERSON IN A WHEELCHAIR

FIELD OF INVENTION

This invention relates to a reclining system for a person in a wheelchair. More particularly, this invention relates to a reclining backrest system which includes a rigid backrest and a brace member which is affixed to the lower edges of the backrest and the wheelchair's vertical frame members. This system also comprises a cushion supported by the front portion of the backrest. The cushion has a plurality of longitudinally extending pockets and a plurality of removable pads adapted for the insertion within the pockets.

DESCRIPTION OF THE PRIOR ART

There are numerous wheelchair seating systems and chairs that have reclining backs.

A wheelchair seating system, is disclosed by Morrison et al in U.S. Pat. No. 5,088,747. A vertical back cushion is utilized, which has a removable member providing hard or firm as well as cushioned seat back characteristics.

The back cushion of the seating system generally includes a rectangular member having a cushion portion and a flap portion. The cushion portion includes a foam pad insert covered by a fabric material outer covering.

The cushion portion may include stitching lines providing a pleasing aesthetic effect. The underside of the cushion portion includes a pair of strips of either hook or loop fasteners on a vertical back sling of the wheelchair. Also a hook or loop fastener is positioned along the lateral bottom edge of the cushion portion for mating with a hook or loop fastener on the bottom of the sling to close off the back and prevent objects from falling out of the wheelchair.

The flap portion is generally formed continuously with a fabric covering including a material pocket. The under side of the fabric flap includes hook or loop fasteners on the back of the wheelchair back sling. Therefore, the flap portion is secured to the back of the wheelchair vertical sling or the vertical support to retain the flap in position.

At the junction of the cushion portion and flap portion, a zipper or the like is positioned to enable access into a support member pocket. The support member pocket includes a support member. The support member is a rectangular board-like member having a width less than the width of the vertical back sling.

The support member may be moved in position from in front of the back sling to behind the back sling. When the support member is in front of the back sling, it provides hard back support surface characteristics. When the support member is moved to behind the back sling, and the hard back support is removed, the support member pocket becomes a storage pocket.

A sling may be substituted on existing wheelchairs or may be installed as original equipment. The sling back may be adjusted for tension or slack between the support members like the sling seat as explained above. The sling back includes a rectangular sheet of material having a plurality of long narrow pockets at one end of the sling back and a single pocket at the other end. The plurality of pockets enables a narrow strip, metallic or plastic, to be removably positioned in them. These pockets, as well as the narrow strip, have a plurality of apertures to enable the fasteners to pass there through to be secured to the chair supports. The pockets may be positioned upon one another in an accordion type pleat so that the fastener passes through all the apertures in the pockets to provide an aesthetic appearance or the last pocket may just be folded back upon the pocket being used and the material of the suspension sling back may bulge inside of the support. By positioning the narrow strip in different pockets, the tension or slack in the sling may be adjusted. The single pocket includes a strip secured therein and stationarily secured to the wheelchair support. Strips of hook or loop fasteners are sewn on the suspension sling back for mating with similar fasteners to position the cushion on the seat sling back.

A go-cart having a reclining backrest, is disclosed by Barschow in U.S. Pat. No. 751,448. Pivoted between its frame is a back. To support the back at different angles, strap-arms are attached to the frame and to the back through a connecting rod, which extends across the rear of the back. The rod is disposed within a cross-strap extending laterally across the rear of the back. Pins or gudgeons, extending through the frame and the lower end of the back, permit the back to pivot.

SUMMARY OF THE INVENTION

The reclining backrest system for a person in a wheelchair having a wheelchair frame which includes a pair of substantially vertical frame members, in the broadest aspect, comprises a backrest and brace members. The backrest is substantially rigid and has longitudinal and lateral edges, the lateral edges including a lower edge. Each of the brace members has some flexibility and is affixed to the lower edges of the backrest and to the pair of vertical frame members.

The reclining backrest system for a person in a wheelchair having a wheelchair frame which includes a pair of substantially vertical members, in another broad aspect, comprises a backrest, brace members and a cushion. The backrest is substantially rigid and has longitudinal and lateral edges, the lateral edges including a lower edge. The flexible brace members are somewhat flexible and are affixed to the lower edges of the backrest and to the pair of vertical frame members. The cushion is supported against the front portion of the rigid backrest, and provides a substantially vertical cushioned backrest. The cushion comprises a plurality of longitudinally extending pockets, each pocket have at least one opening, disposed against the front portion of the backrest, and a plurality of removable pads adapted for insertion within the pockets, and provides individual cushioned back surfaces.

An object on the present invention is to provide a reclining backrest system which provides upper body control for individuals, particular those patients in nursing homes, who lean or fall forward and at the same time reduce pressure on the ischial area.

Another object of the present invention is to provide a reclining backrest system which can economically convert any standard wheelchair to a wheelchair with a reclining backrest.

A further object of the present invention is to provide a reclining backrest system which is easily installed in any standard wheelchair.

A still further object of the present invention is to provide a reclining backrest system which is completely adjustable and accommodates any degree of tilt required by the user.

BRIEF DESCRIPTION OF THE DRAWINGS

The above and other objects and advantages and novel features of the present invention will become apparent from the following detailed description of the preferred and alternative embodiments of the invention illustrated in the accompanying drawings, in which:

FIG. 3 is a simplified front view of the preferred embodiment of the reclining system of the present invention in place in a wheelchair;

FIG. 7 is a cross-sectional view taken along line 7—7 of FIG. 3;

FIG. 9 is a simplified fragmentary front view of the upper portion of another embodiment of the backrest system.

DETAILED DESCRIPTION OF THE INVENTION

Figure 1:
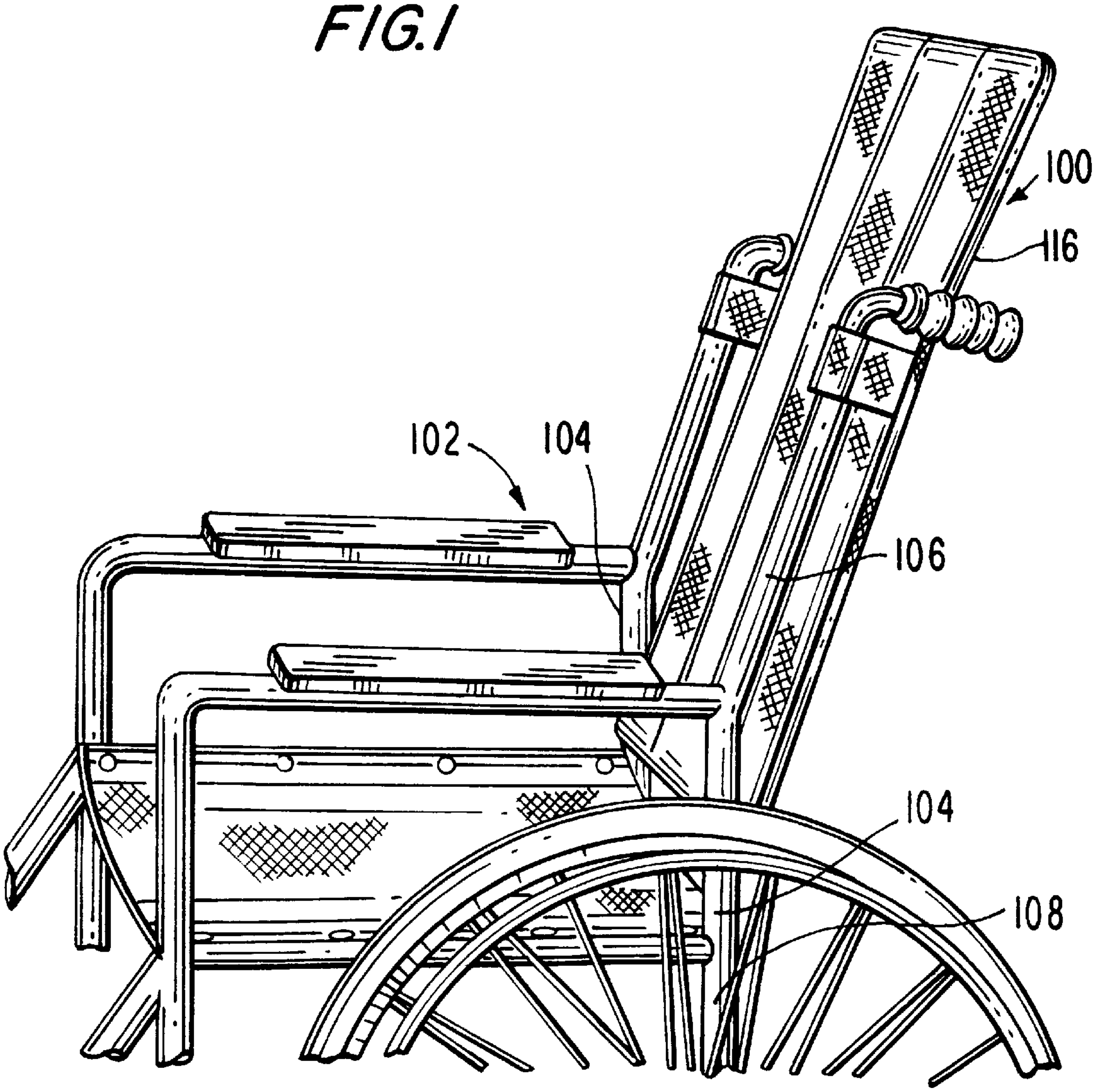
FIG. 1 is a simplified perspective view of the preferred embodiment of the reclining system of the present invention in place in a wheelchair.
Figure 2:
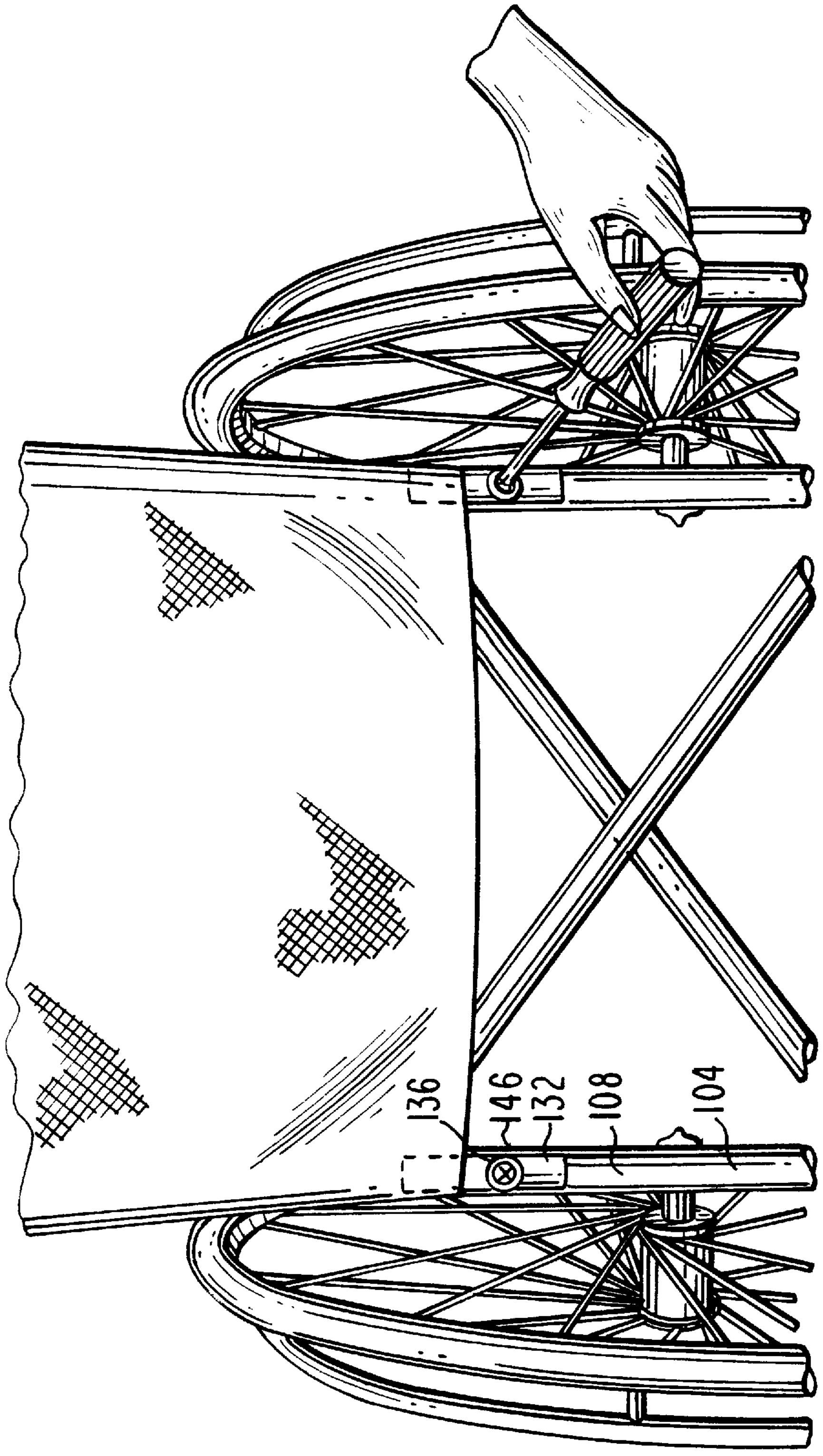
FIG. 2 is a simplified, partial, rear perspective view of the reclining system.
Figure 4:
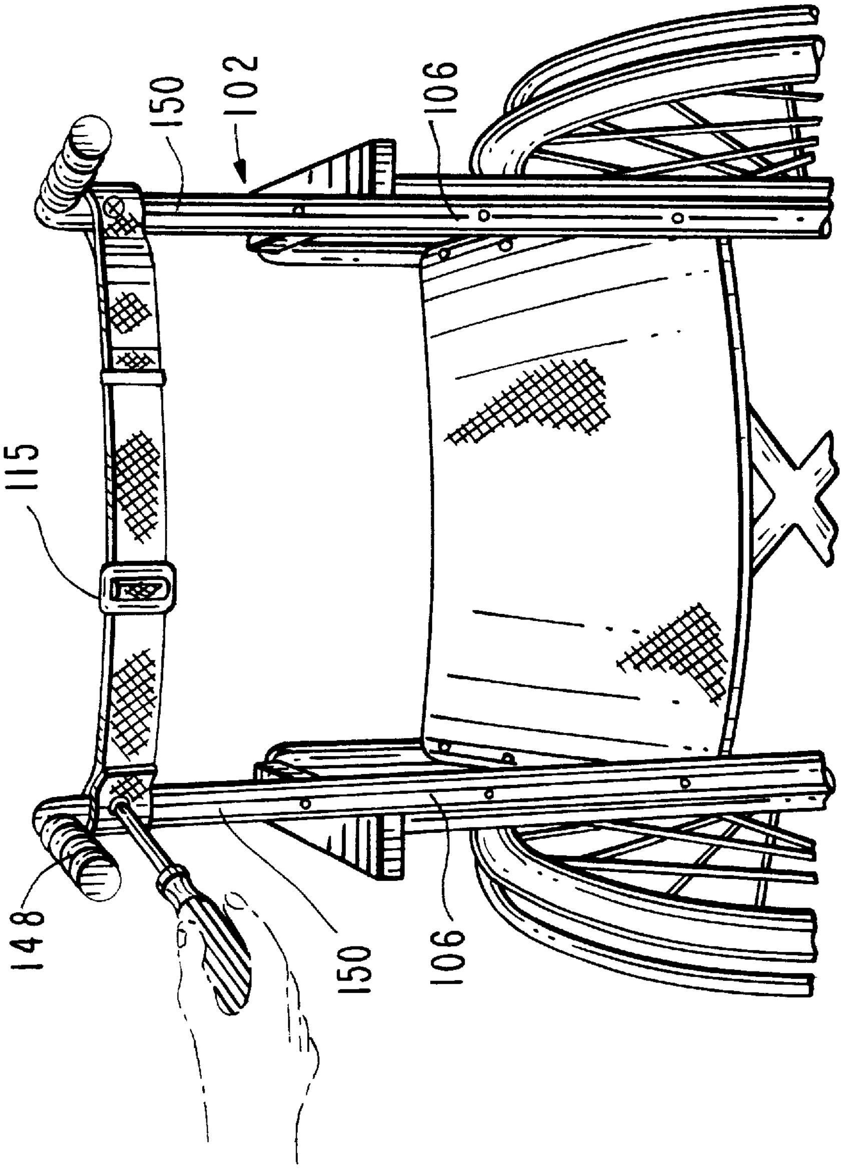
FIG. 4 is a simplified rear view of the support belt portion of the reclining system.
Figure 5:
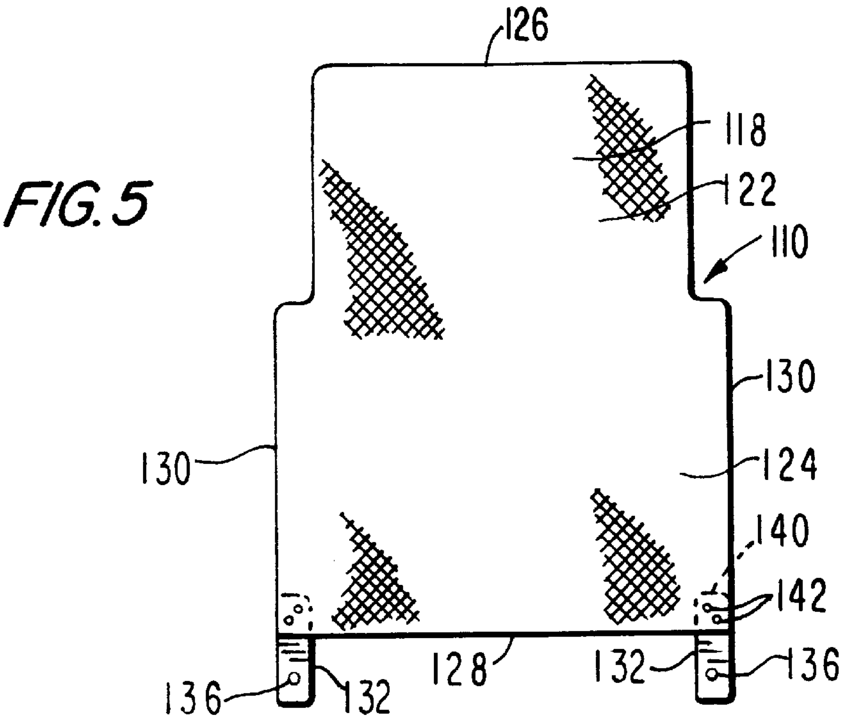
FIG. 5 is a front view of the backrest portion of the reclining system.
Figure 6:
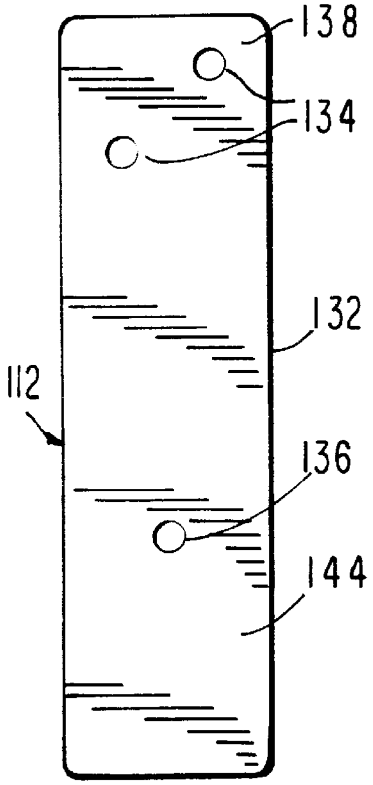
FIG. 6 is a top plan view of a brace member.

The reclining system for a person in a wheelchair is generally referred to by reference numeral 100. Referring to FIGS. 1–5, the wheelchair in which such system is utilized is referred to by reference numeral 102; it comprises a pair of conventional vertical frame members 104 having upper and lower portions, 106 and 108, respectively. The preferred embodiment of the reclining system 100 essentially comprises a substantially rigid backrest 110 (FIG. 5), a flexible brace means or member 112 (FIG. 6), an adjustable support belt 114 having a buckle 115 (FIG. 4) and a cushion means 116 for providing a cushioned vertical backrest (FIG. 3). The backrest 110 is generally rectangular shaped and has front and back portions, 118 and 120, respectively. It also has upper and lower portions, 122 and 124, respectively, upper and lower lateral edges, 126 and 128, respectively, and a pair of longitudinal edges 130. The rigid backrest 110 is preferably made of a molded plastic frame. The flexible brace means 112 comprises a pair of flat, elongated, brace members 132 (FIG. 6), having a pair of upper apertures 134 and a single lower aperture 136. The brace members 132 are preferable made of spring steel. The upper end 138 of each of the brace members 132 (FIG. 5), is attached to the lower end 140 of the backrest 110 along the longitudinal edge 130 thereof using conventional bolts (not shown) inserted through the apertures 134 at the upper end 138 of the brace member 132 and coincidentally disposed aperture 142 formed in the lower end 140 of the backrest 110 (FIG. 2); conventional nuts (not shown) are used to tighten and hold these elements together. The lower end 144 of each of the brace members 132 is attached to the lower portion 108 of one of the vertical frame members 104 using a conventional bolt (not shown) inserted there through the single aperture 136 at the lower end 144 of the brace member 132 and through an aperture 146 formed in the frame member 104; a conventional nut (not shown) is used to tighten and hold these elements together.

The adjustable support belt 114 (FIG. 4) is disposed below the pushhandles 148 of the wheelchair 102 and conventionally affixed to each end to the upper end 150 of the upper portions 106 of the vertical frame members 104.

The cushion means 116 (FIGS. 3 and 7), comprises a plurality of longitudinally extending pockets 152, disposed against the front portion 118 of the backrest 110, a plurality of removable pads 156, preferably made of foam, adapted for being disposed within said pockets 152, and a rear pocket means 158 for securing the plurality of pockets 152 to backrest 110. Each of the pockets 152 have at least one opening 154 therein. The removable pads 156 provide individual, cushioned, back surfaces. The plurality of pockets 152 comprise first and second sets, of longitudinally extending pockets, 160 and 162, disposed, respectively, against the upper and lower portions 122 and 124. Each of the pockets 152 in the first set of pockets 160 have an opening at each end; the same is true of the second set of pockets 162-however the opening at the lower end thereof is only partially open, whereas the other opening are fully open. The rear pocket means 158 is generally rectangular in shape and conforms to the shape of the backrest 110 and extends downward from the upper edge 164 of the cushion means 116 to its lower edge 166. The plurality of removable pads 156 comprise first and second sets of longitudinally extending pads, 168 and 170, adapted for being disposed within, respectively the first and second sets of pockets 160 and 162. The cushion means 116 is preferably made of a vinyl material.

Figure 8:
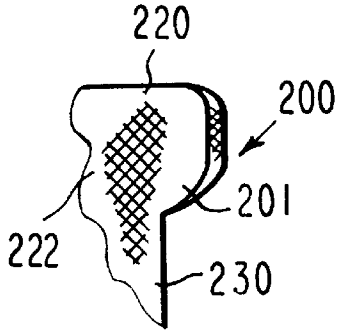
FIG. 8 is a simplified fragmentary view of the upper portion of another embodiment of the backrest.

An alternative embodiment of the reclining system is generally referred to by reference number 200, and comprises the same elements of the preferred system 100, a rigid backrest 220, a flexible brace means, an adjustable support belt and a cushion means 216, except that both the backrest 220 and cushion means 216 include, respectively, a pair of wing portions and wing cushions means, 201 and 203 (FIGS. 8 and 9), and a pair of removable wing pads 209, disposed within said wing cushion means 203. The wing portions 201 (only one of which is shown) extend generally laterally from the longitudinal edges 230 of the upper portion 222 of the backrest 220. The wing cushion means 203 comprise a pair of lateral trunk brace pockets 205 (only one of which is shown), connected to and extending laterally from the upper side edges 207 of the first set of pockets 260. Disposed within the lateral brace pockets 205 are removable wing pads 209 (only one of which is shown in dotted lines) shaped to fit within said pockets 205.

To install the reclining system 100, the existing backrest is removed. Normally this is accomplished by removing several screws which secure the backrest to the upper portion 106 of the vertical frame members 104, thereby revealing the screw holes into which they are to be affixed. Then the adjustable support belt 114 is looped over the pushhandles 148 and their ends are conventionally affixed to the upper ends 150 of the vertical frame members 104. The backrest 110 is then positioned in front of the support belt 114 and the lower apertures 136 of the brace members 112 are aligned with the lowest screw holes on the lower portions 108 of the vertical frame 104. Then the cushion means 116 is slid over the backrest 110 and more particularly by sliding the rear pocket means 158 over the backrest 110 so that the two sets of pockets 160 and 162 are disposed over the front portion 118 of the backrest 110. Then the first and second sets of pads, 160 an 162, respectively, are inserted through the upper openings 154 of the two sets of pockets 160 and 162. These pads can be added or removed from their pockets so that the backrest system 100 can be adjusted to meet the particular alignment needs of each user. Various different sized pads can be utilized to provide the required alignment, including pads having different lengths, depths and/or different firmness. Finally, the desired degree of tilt for the backrest can be achieved by adjusting the support belt 114 by moving its buckle laterally; up to 20 degrees of the tilt is provided.

While the preferred and alternative embodiments of the invention have been illustrated and described, it will be understood by those skilled in the art that changes and modifications may be resorted to without departing from the spirit and scope of the invention.

What is claimed is:

1. A reclining backrest system for a person in a wheelchair having a wheelchair frame which includes a pair of substantially vertical frame members comprising:

a substantially rigid backrest having longitudinal and lateral edges, said lateral edges including a lower edge; and flexible brace means, affixed to the lower edges of said backrest and to the pair of substantially vertical frame members.

2. A reclining backrest system as recited in claim 1, wherein said brace means comprises spring steel.

3. A reclining backrest system as recited in claim 2, wherein said backrest has an upper portion, and further includes a pair of wing portions extending generally laterally from the horizontal edges of the upper portion of the backrest.

4. A reclining backrest system as recited in claim 3, wherein said brace means comprises a flat, elongated member.

5. A reclining backrest system as recited in claim 4, wherein said brace means being affixed to the longitudinal edges of said backrest.

6. A reclining backrest system as recited in claim 5, wherein said brace means extend longitudinally along the longitudinal edges of said backrest and said vertical frame members.

7. A reclining backrest system as recited in claim 6, wherein said vertical members comprise upper portions, and further including a support belt attached between the upper portions of said vertical frame members.

8. A reclining backrest system as recited in claim 7, wherein said support belt is adjustable.

9. A reclining backrest system as recited in claim 1, wherein said flexible brace means permits the angle of the rigid backrest to vary as a function of the angular position of the back of said person while said person is sitting in said wheelchair.

10. A reclining backrest system as recited in claim 1, wherein said brace means comprises only a single pair of flexible brace means.

11. A reclining backrest system as recited in claim 1, wherein said brace means being nonadjustable.

12. A reclining backrest system as recited in claim 1, wherein said brace means permits only the angle of the rigid backrest to vary.

13. A reclining backrest system for a person in a wheelchair having a wheelchair frame which includes a pair of substantially vertical members, comprising;

a substantially rigid backrest having longitudinal and lateral edges, said lateral edges including a lower edge;

flexible brace means, affixed to the lower edges of said backrest and to the pair of substantially vertical frame members; and cushion means, supported against the front portion of said rigid backrest, for providing a cushioned, substantially vertical, backrest, comprising:

at least one longitudinally extending pocket, each pocket having at least one opening, disposed against the front portion of said backrest, and adapted to permit cushioning means to be positioned therein.

14. A reclining backrest system as recited in claim 13, further comprising a plurality of longitudinally extending pockets.

15. A reclining backrest system as recited in claim 14, further comprising a plurality of removable pads.

16. A reclining backrest system as recited in claim 13, wherein said plurality of longitudinally extending pockets comprise;

first and second sets of longitudinally extending pockets disposed, respectively, against the upper and lower front portions.

17. A reclining backrest system as recited in claim 16, wherein said first and second sets of pockets have an opening at each end.

18. A reclining backrest system as recited in claim 17, wherein said second set of pockets has an opening at its lower end which is only partially open.

19. A reclining backrest system as recited in claim 18, wherein said cushion means includes a rear pocket means for securing said plurality of pockets to said backrest.

20. A reclining backrest system as recited in claim 13, wherein one said cushion means being made of resilient material.

21. A reclining backrest system as recited in claim 13, wherein said backrest has an upper portion, and further comprise a pair of wing portions extending generally laterally from the opposite longitudinal edges, wherein said cushion means further comprise a pair of lateral trunk brace pockets, for bracing both sides of the person's torso in a substantially upright position, and a pair of removable pads adapted for being disposed within said lateral trunk brace pockets, said pair of brace pockets affixed to and laterally extending from the upper side edges of said cushion means.

22. A reclining backrest system as recited in claim 13, further including at least one removable pad adapted for being disposed within said pocket, for providing individual cushioned back surfaces.

23. A reclining backrest system for a person in a wheelchair having a wheelchair frame which includes a pair of substantially vertical frame members having upper portions, comprising:

a substantially rigid backrest having upper and lower portions and longitudinal and lateral edges, said lateral edges including a lower edge;

a flexible brace means formed of a flat elongated spring steel member, affixed to the lower longitudinal edges of said backrest and said vertical frame members; and an adjustable support belt attached between the upper portions of said vertical frame members;

a cushion means, support against the front portion of said rigid backrest, for providing an individually adjustable, cushioned, vertical backrest, comprising;

a first set of longitudinally extending pockets disposed against the upper front portion of the backrest, having an opening at each end, a second set of longitudinally extending pockets disposed against the upper front portion of the backrest, having an opening at each end, the openings at the lower end being partially open, a first and second set of removable pads adapted for being disposed, respectively, within said first and second sets of pockets, for providing individual cushioned back surfaces, and rear pocket means for securing said first and second sets of pockets to said backrest.

24. A reclining backrest system for a person in a wheelchair having a wheelchair frame which includes a pair of substantially vertical frame members comprising:

a substantially rigid backrest having longitudinal and lateral edges, said lateral edges including a lower edge; and flexible brace means, affixed to the lower edges of said backrest and to the pair of substantially vertical frame members, for maintaining said backrest in an essentially vertical position.

* * * * *